United States Patent
Tilaye et al.

(10) Patent No.: US 11,032,580 B2
(45) Date of Patent: Jun. 8, 2021

(54) SYSTEMS AND METHODS FOR FACILITATING A PERSONALIZED VIEWING EXPERIENCE

(71) Applicant: Dish Network L.L.C., Englewood, CO (US)

(72) Inventors: Swapnil Anil Tilaye, Broomfield, CO (US); Rima Shah, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/845,704

(22) Filed: Dec. 18, 2017

(65) Prior Publication Data

US 2019/0191188 A1    Jun. 20, 2019

(51) Int. Cl.
| H04N 21/218 | (2011.01) |
| H04N 21/472 | (2011.01) |
| H04N 21/4728 | (2011.01) |
| H04N 21/8549 | (2011.01) |
| H04N 21/234 | (2011.01) |

(52) U.S. Cl.
CPC . *H04N 21/21805* (2013.01); *H04N 21/23418* (2013.01); *H04N 21/472* (2013.01); *H04N 21/4728* (2013.01); *H04N 21/8549* (2013.01)

(58) Field of Classification Search
CPC .......... H04N 21/422; H04N 21/44008; H04N 21/472; H04N 5/23238; H04N 21/23418; H04N 19/17; H04N 21/21805; H04N 21/4828; H04N 21/25891; H04N 21/8456; H04N 21/8549; H04N 5/783; H04N 5/91; H04N 2005/4412; H04N 21/23424; H04N 21/234318; H04N 21/235; H04N 21/252; H04N 21/26603; H04N 21/2668; H04N 21/42204; H04N 21/4728; G06K 9/00751; G06K 9/00288; G06K 9/00711; G06K 9/00221; G06K 9/00671

See application file for complete search history.

(56) References Cited

U.S. PATENT DOCUMENTS

| 5,005,204 A | 4/1991 | Deaett |
| 6,204,840 B1 | 3/2001 | Petelycky et al. |
| 8,854,447 B2 | 10/2014 | Conness et al. |
| 9,053,711 B1 | 6/2015 | Smith et al. |
| 9,251,798 B2 | 2/2016 | Miao et al. |
| 9,292,895 B2 | 3/2016 | Rodriguez et al. |
| 9,299,364 B1 | 3/2016 | Pereira et al. |

(Continued)

OTHER PUBLICATIONS

Hoekstra et al., "Presentation Agents That Adapts to Users' Visual Interest and Follow Their Preferences," Proceedings of the 5th International Conference on Computer Vision System, 2007, 10 pages.

*Primary Examiner* — Mulugeta Mengesha
*Assistant Examiner* — Alazar Tilahun
(74) *Attorney, Agent, or Firm* — Perkins Coie LLP

(57) ABSTRACT

Embodiments are related to processing of a source video stream for generation of a target video stream that includes an object of interest to a viewer. In some embodiments, the target video stream may exclusively or primarily include the performance of the object of interest to the viewer, without including other persons in that video. This allows a viewer to focus on an object of his or her interest and not necessarily have to view the performances of other objects in the source video stream.

17 Claims, 4 Drawing Sheets

(56) References Cited

U.S. PATENT DOCUMENTS

| | | |
|---|---|---|
| 9,456,273 B2 | 9/2016 | Wang et al. |
| 9,626,084 B2 | 4/2017 | Waggoner et al. |
| 9,728,188 B1 | 8/2017 | Rosen et al. |
| 9,904,509 B1 | 2/2018 | Raffa et al. |
| 9,912,373 B1 | 3/2018 | Wang |
| 10,121,165 B1 | 11/2018 | Mohajer et al. |
| 10,276,175 B1 | 4/2019 | Garcia |
| 10,365,885 B1 | 7/2019 | Naik et al. |
| 10,657,174 B2 | 5/2020 | Master et al. |
| 2002/0035723 A1 | 3/2002 | Inoue et al. |
| 2002/0152117 A1 | 10/2002 | Cristofalo et al. |
| 2003/0122862 A1 | 7/2003 | Takaku et al. |
| 2003/0229514 A2 | 12/2003 | Brown |
| 2005/0065976 A1 | 3/2005 | Holm et al. |
| 2007/0005795 A1 | 1/2007 | Gonzalez |
| 2007/0087756 A1 | 4/2007 | Hoffberg |
| 2007/0250716 A1 | 10/2007 | Brunk et al. |
| 2008/0041220 A1 | 2/2008 | Foust et al. |
| 2010/0332003 A1 | 12/2010 | Yaguez |
| 2011/0013790 A1 | 1/2011 | Hilpert et al. |
| 2011/0082877 A1 | 4/2011 | Gupta et al. |
| 2012/0155653 A1 | 6/2012 | Jax et al. |
| 2013/0007201 A1 | 1/2013 | Jeffrey et al. |
| 2013/0318071 A1 | 11/2013 | Cho et al. |
| 2013/0345840 A1 | 12/2013 | Lempel et al. |
| 2014/0016787 A1 | 1/2014 | Neuendorf et al. |
| 2014/0032775 A1* | 1/2014 | Abiezzi ............... H04N 19/51 709/231 |
| 2014/0195028 A1 | 7/2014 | Emerson, III |
| 2014/0307896 A1 | 10/2014 | Park et al. |
| 2014/0330413 A1 | 11/2014 | Anniballi |
| 2015/0149173 A1 | 5/2015 | Korycki |
| 2015/0172787 A1 | 6/2015 | Geramifard |
| 2015/0193199 A1 | 7/2015 | Kim et al. |
| 2015/0205864 A1 | 7/2015 | Fuzell-Casey et al. |
| 2015/0215496 A1 | 7/2015 | Matsuo |
| 2015/0220633 A1 | 8/2015 | Fuzell-Casey et al. |
| 2015/0234564 A1 | 8/2015 | Snibbe et al. |
| 2015/0269951 A1 | 9/2015 | Kalker et al. |
| 2015/0331661 A1 | 11/2015 | Kalampoukas et al. |
| 2015/0332667 A1 | 11/2015 | Mason |
| 2016/0054903 A1 | 2/2016 | Jeong et al. |
| 2016/0071546 A1 | 3/2016 | Neymotin et al. |
| 2016/0103652 A1 | 4/2016 | Kuniansky |
| 2016/0125889 A1 | 5/2016 | Westerman |
| 2016/0192105 A1 | 6/2016 | Breebaart et al. |
| 2016/0247537 A1* | 8/2016 | Ricciardi ............. G11B 27/036 |
| 2016/0261953 A1 | 9/2016 | Aggarwal et al. |
| 2016/0292266 A1 | 10/2016 | Mont-Reynaud et al. |
| 2017/0048596 A1 | 2/2017 | Fonseca, Jr. et al. |
| 2017/0072321 A1* | 3/2017 | Thompson ....... H04N 21/23424 |
| 2017/0099558 A1 | 4/2017 | Sptiznagle et al. |
| 2017/0109128 A1 | 4/2017 | Parvizi et al. |
| 2017/0125014 A1 | 5/2017 | Pogorelik et al. |
| 2017/0169833 A1 | 6/2017 | Lecomte et al. |
| 2017/0185375 A1 | 6/2017 | Martel et al. |
| 2017/0199934 A1 | 7/2017 | Nongpiur et al. |
| 2017/0229121 A1 | 8/2017 | Taki et al. |
| 2017/0244959 A1* | 8/2017 | Ranjeet ............ G08B 13/19641 |
| 2017/0293461 A1 | 10/2017 | McCauley et al. |
| 2017/0309298 A1 | 10/2017 | Scott et al. |
| 2017/0329493 A1* | 11/2017 | Jia ...................... G06F 3/04842 |
| 2017/0332036 A1 | 11/2017 | Panchaksharaiah et al. |
| 2018/0014041 A1 | 1/2018 | Chen et al. |
| 2018/0060022 A1 | 3/2018 | Kozlov |
| 2018/0060428 A1 | 3/2018 | Lee et al. |
| 2018/0095643 A1* | 4/2018 | Jia ........................ G06K 9/6202 |
| 2018/0122403 A1 | 5/2018 | Koretzky |
| 2018/0139268 A1 | 5/2018 | Fuzell-Casey et al. |
| 2018/0146446 A1 | 5/2018 | Mate |
| 2018/0189020 A1 | 7/2018 | Oskarsson et al. |
| 2018/0322887 A1 | 11/2018 | Choo et al. |
| 2018/0341455 A1 | 11/2018 | Inanov et al. |
| 2019/0013027 A1 | 1/2019 | Page et al. |
| 2019/0294409 A1 | 9/2019 | Raikar et al. |

* cited by examiner

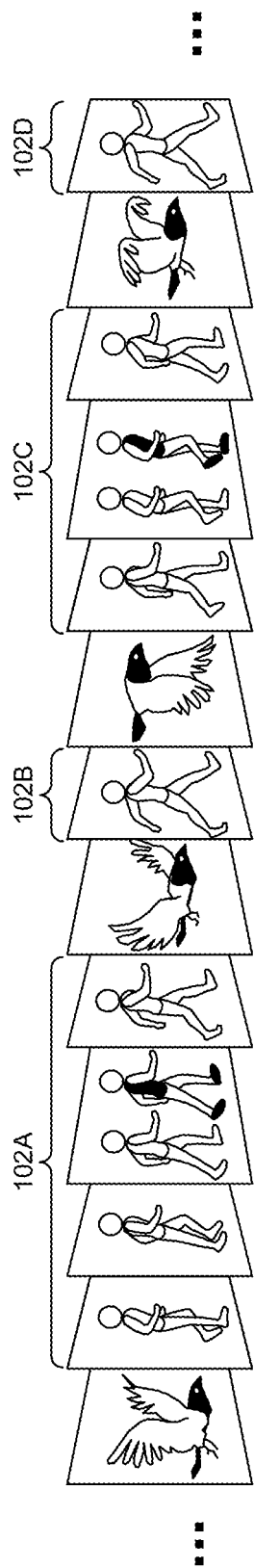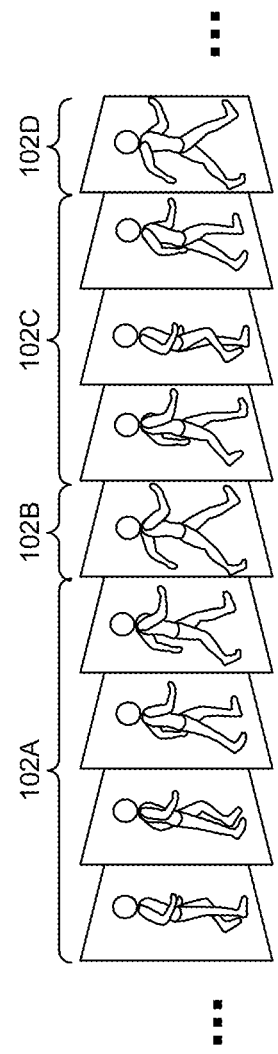
FIG. 1A
FIG. 1B

SYSTEMS AND METHODS FOR FACILITATING A PERSONALIZED VIEWING EXPERIENCE

BACKGROUND

Videos are sequences of a large number of images, each of which called a frame, displayed in fast enough frequency so that the human eyes can perceive that as continuous content. Each frame of a video can have multiple objects, some of which may be animate (e.g., animals, insects, human beings, etc.) and some may be inanimate (e.g., rocks, chairs, books, etc., or things that do not have a life). In many applications, a viewer of a video may be interested in watching a specific object included in the video without having to watch the other objects. For example, the quarterback coach of a sports team might be interested in watching only the video frames that include the quarterback and no other player. In a similar manner, the defensive coordinator of a sports team may be interested only in watching the performance of a specific linebacker and no other player. As another example, a mother watching the video of a dance performance of her son's dancing group might be interested in watching only her son's moves. Thus, in these applications, a viewer of an original video may be interested in viewing the performance/progression of a specific object of interest in a video. Consequently, there is a need for systems and methods that provide a personalized viewing experience to viewers by focusing on an object of interest to the viewer.

SUMMARY

Disclosed embodiments are directed at systems, methods, and apparatus for facilitating a personalized viewing experience. The method includes receiving a source video stream including multiple objects, wherein the source video stream includes a plurality of frames; identifying, within a frame in the plurality of frames, an object of interest to a viewer from the multiple objects based on specific audio or video features of the object of interest; automatically switching across the plurality of frames based on the specific audio or video features of the object of interest by identifying at least one frame in the plurality of frames having the object of interest; segmenting the source video stream into multiple chunks, wherein each chunk includes the at least one frame having the object of interest; and generating a target video stream by multiplexing the multiple chunks, the target video stream including sequentially-arranged frames having the object of interest.

BRIEF DESCRIPTION OF THE DRAWINGS

FIGS. 1A and 1B illustrate a representative operation of the disclosed system for facilitating a personalized viewing experience, according to some embodiments of the disclosed technology.

DETAILED DESCRIPTION OF THE DRAWINGS

Figure 2:
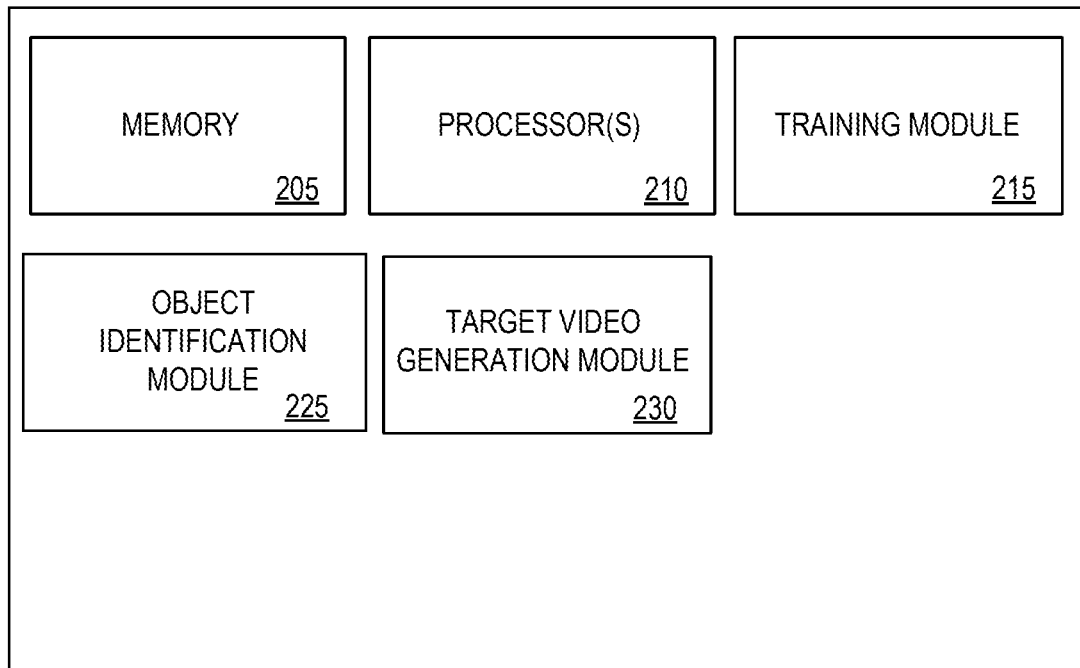
FIG. 2 illustrates an example architecture of a system for generating a target video stream having an object of interest to a viewer from a source video stream having multiple objects, according to some embodiments of the disclosed technology.

The following detailed description of the invention is merely exemplary in nature and is not intended to limit the invention or the application and uses of the invention. Furthermore, there is no intention to be bound by any theory presented in the preceding background or the following detailed description.

The various embodiments described herein generally provide apparatus, systems and methods related to processing of a source video stream for generation of a target video stream that includes an object of interest to a viewer. In some embodiments, the target video stream may exclusively or primarily include the performance of the object of interest to the viewer, without including other persons in that video. This allows a viewer to focus on an object of his or her interest and not necessarily have to view the performances of other objects in the source video stream.

The object of interest in the original source video stream can be any animate or inanimate object. Non-limiting examples of a source video stream can be personal video recordings, TV shows, sports, movies, music, documentaries, streaming content from content providers such as NETFLIX©, HULU©, YOUTUBE©, HBO GO©, etc. In some embodiments, the viewer can express an indication of an object of interest in the source video stream by inputting/providing a textual description, by uploading/providing/submitting one or more images of the object of interest, by identifying (based on an identifier such as a name, a role in an event, or an image) an object of interest from a plurality of objects displayed on a menu of a user interface, or by providing one or more videos including the object of interest.

For example, the father of a high school student may be interested in watching the recorded performance of his son, i.e., an object of interest in a video of a game of the school's basketball team. The father may provide/upload/submit an image of his son to the disclosed system. The disclosed system receives the image of the son and tries to find a match between objects in each frame of the game's recording and the image of the son. Upon identifying the frames that include the son, the disclosed system can create a (new) target video stream that includes the son without necessarily including other players in the game. In some embodiments, a match between objects in a frame and the image of the son can be detected using any object recognition or machine learning algorithm. The disclosed system processes each of the video frames to identify frames that include the object of interest. These frames are then aggregated ("stitched") together to produce the target video stream.

In some implementations, the target video stream is re-encoded at the same quality or a lower quality than the source video stream. For example, the source video stream can be a 4K video and a target video stream may be of ultra high definition (UHD), high definition (HD) or standard definition (SD) quality. The source video stream can be raw (unedited) footage shot on a video camera, an over-the-air broadcast from a satellite or cable television distribution system, or any other video. The source video stream may also be transferred over any type of communication network, such as the Internet or other wide area network, a local area network, a private network, a mobile communication system, a terrestrial television network, a cable television network, and a satellite television network. Additionally, the source video stream may be transmitted by way of any communication technology, such as by satellite, wire or optical cable, wireless, or other means. Further, the source video stream may be delivered by any transmission method, such as broadcast, multicast, simulcast, closed circuit, pay-per-view, on-demand, over-the-top (by "streaming," file transfer, or other means), or other methods. The source video stream could also be saved as a digital file in any computing device.

As one example environment, a school operating the disclosed system can have a publicly-accessible web portal of the school's football team. The web portal can have a video of each game played by the team. For each video, the web portal can provide a menu displaying one or more members of the school's football team as selectable objects of interest. A person who is interested in team member A can select team member A as the object of interest. When the person chooses a game, the disclosed system can display a video (a/k/a target video stream) of the game to the person that includes team member A primarily or exclusively. In some embodiments, the disclosed system can also provide the person an option to view the original video (a/k/a source video stream) of the game. The objects of interest can be displayed on the menu by their name, a position that they play, an identifying image, or by any other suitable means.

Prior to generating the target video stream, the disclosed system is trained to identify the objects of interest from a training set of videos/images, using machine learning methodologies such as TENSORFLOW or YOLO. In the example of the school football team, a training set of videos can be a collection of videos or images of an object of interest (e.g., a quarterback). Based on the system getting trained using the training set of videos, the disclosed system is able to identify and extract frames that include the object of interest (e.g., the quarterback), from a source video stream of a recorded game. A training set, for example, can be for created for one or more persons/actors in a video. In the context of a football game, if each team has eleven players on the field at any instant, then there can be at most twenty-two (22) objects of interest. Hence, twenty-two (22) training sets can be used to train the system, with each set having several videos/images of a player.

In some embodiments, the disclosed system is able to tag one or more objects of interest in the source video stream, based on the system getting trained using the training set of videos. These tags can include an identification of the object of interest and can be overlayed on the objects of interest in the source; and displayed on a user interface. When a viewer viewing the source video stream desires to exclusively or primarily watch the performance of the object of interest to the viewer, the viewer can click on the tag, which causes the system to start playing a target video stream associated with the object of interest to the viewer. For example, this functionality can be included in the context of a set top box (STB) or digital video recorder (DVR) which can switch from playing the source video stream to playing the target video stream, in response to a prompt by a viewer clicking on a remote control operative to control the STB or the DVR.

Embodiments of the disclosed system can be owned and operated by organizations (for profit or non-profit), schools, cable companies, broadcasting companies, or private individuals.

FIG. 1A-FIG. 1B illustrate a representative operation of the disclosed system. FIG. 1A shows a source video stream with example chunks 102A, 102B, 102, and 102D including frames having the object of interest (a walking man wearing white pants) to a viewer. There may be other objects in a frame. For example, the walking man with black pants is another object that appears in some frames. It is assumed that the viewer has specified a selection of this object of interest to the disclosed system. As a result, the disclosed system identifies chunks 102A, 102B, 102, and 102D of video frames that include the object of interest to the viewer.

FIG. 1B shows a target video stream with the chunks 102A, 102B, 102C, and 102D multiplexed to form the target video stream. Even though some embodiments can contemplate multiple processors assigned with identifying the chunks 102A, 102B, 102C, and 102D the target video stream includes these chunks with sequentially-arranged frames having the object of interest.

FIG. 2 illustrates an example architecture of a system in accordance with disclosed embodiments for generating a target video stream with an object of interest to a viewer from a source video stream having multiple objects. According to the embodiments shown in FIG. 2, the disclosed system (e.g., configured as one or more physical servers or cloud servers) can include memory 205, one or more processors 210, training module 215, object identification module 225, and target video generation module 230. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of training module 215, object identification module 225, and target video generation module 230. Generally, memory 205 can include any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Training module 215 is configured to "learn" specific audio and video features associated with the object of interest from the one or more training content, during a training phase. Examples of specific audio and video features associated with an object of interest can be a color of the object of interest, geometric attributes such as a height/width/depth of the object of interest, whether the object of interest changes form (animate) or does not change form (inanimate). Additionally, if the object of interest is animate, then specific audio and video features can be a color of different parts (e.g., the eyes, the shirt, the pants, etc.) of the object of interest, a pitch or a frequency of a voice of the object of interest, or an instrument played by the object of interest.

Object identification module 225 is configured to identify frames that include the object of interest.

Target video generation module 230 is configured to generate the target video streams. For example, these frames maybe aggregated ("stitched") together to produce the target video stream as a continuous stream and not a disjointed stream.

Figure 3:
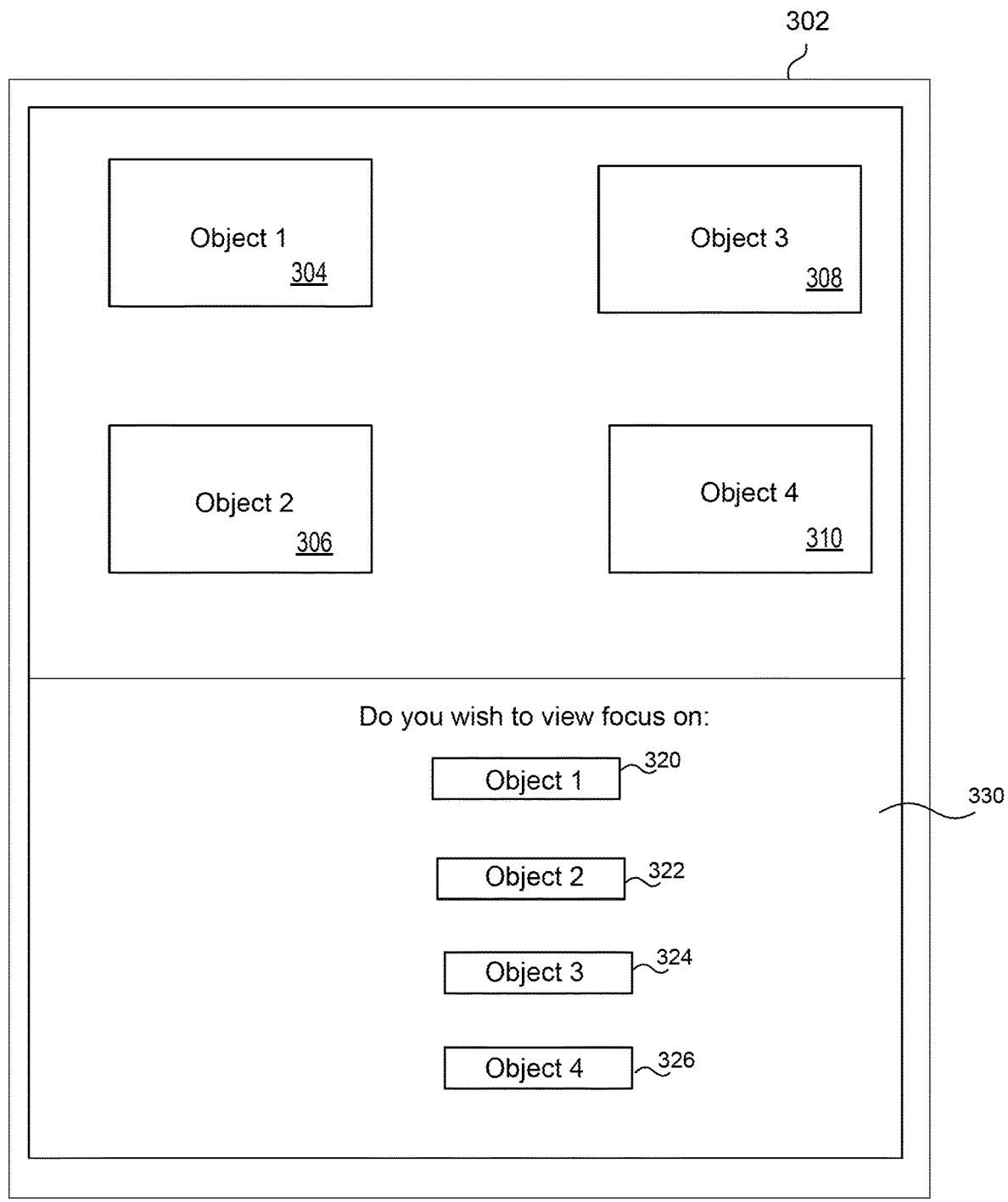
FIG. 3 illustrates an example snapshot of an user interface in accordance with disclosed embodiments for generating a target video stream having an object of interest to a viewer from a source video stream, according to some embodiments of the disclosed technology.

FIG. 3 illustrates an example snapshot 302 of an user interface in accordance with disclosed embodiments for generating a target video stream with an object of interest to a viewer from a source video stream. The user interface can be displayed on a monitor such as a mobile device monitor, a computer monitor, or a TV monitor. The user interface can be displayed by a remote web portal (e.g., of a school's football team or of a dance group or of a streaming content provider) or electronic programming content (e.g., a TV show, a movie, or a documentary) displayed by a STB or a DVR. Thus, a viewer can interact with the user interface by clicking a button, hovering a mouse, or giving a voice command using any mechanism involving a remote control, a mobile device, or any type of suitable input device operative to interact with the user interface.

The snapshot 302 corresponds to a source video stream and includes four objects, object 1, object 2, object 3, object 4 denoted as 302, 304, 306, 308 respectively. In some embodiments, the snapshot 302 can be a static snapshot, e.g., produced when a viewer pauses the source video stream while playing. In some embodiments, a viewer does not necessarily have to pause the video stream while playing and the four objects in the snapshot are tagged or labeled as object 1, object 2, object 3, or object 4. Region 330 of snapshot 302 includes a message/notification region in which the user interface queries the viewer whether the viewer wishes to focus on object 1, object 2, object 3, or object 4. A user can specify a selection of his or her object of interest by clicking on any of buttons 320, 322, 324, or 326. In some embodiments, region 330 is generated when the user clicks on a button or otherwise interacts with the user interface. Accordingly, the disclosed system may generate a target video stream with the specified target of interest.

In some embodiments, the disclosed system automatically identifies based on tracking an eye movement of the viewer that is viewing the user interface. For example, cameras coupled to a TV, a STB, a computer monitor, a mobile device, or other devices can track the eye movement of a viewer over time. The cameras may transmit to the disclosed system information (e.g., over a wired or a wireless network) relating to a viewer's eye movement. Upon receiving the information, the disclosed system can process this information to determine which object if of interest to the user.

In some embodiments, user interface corresponds to a web page (e.g., of a school's football team) showing four possible choices (e.g., four players on the football team) that can be of possible interest to a user in connection with a source video stream (e.g., a recording of a football game). A user can click on one of the four objects to specify an object of interest. Accordingly, the disclosed system may generate a target video stream with the specified object of interest.

In some embodiments, the disclosed application program can be integrated with a voice control system such as AMAZON© ALEXA© or GOOGLE© ASSISTANT©.

Figure 4:
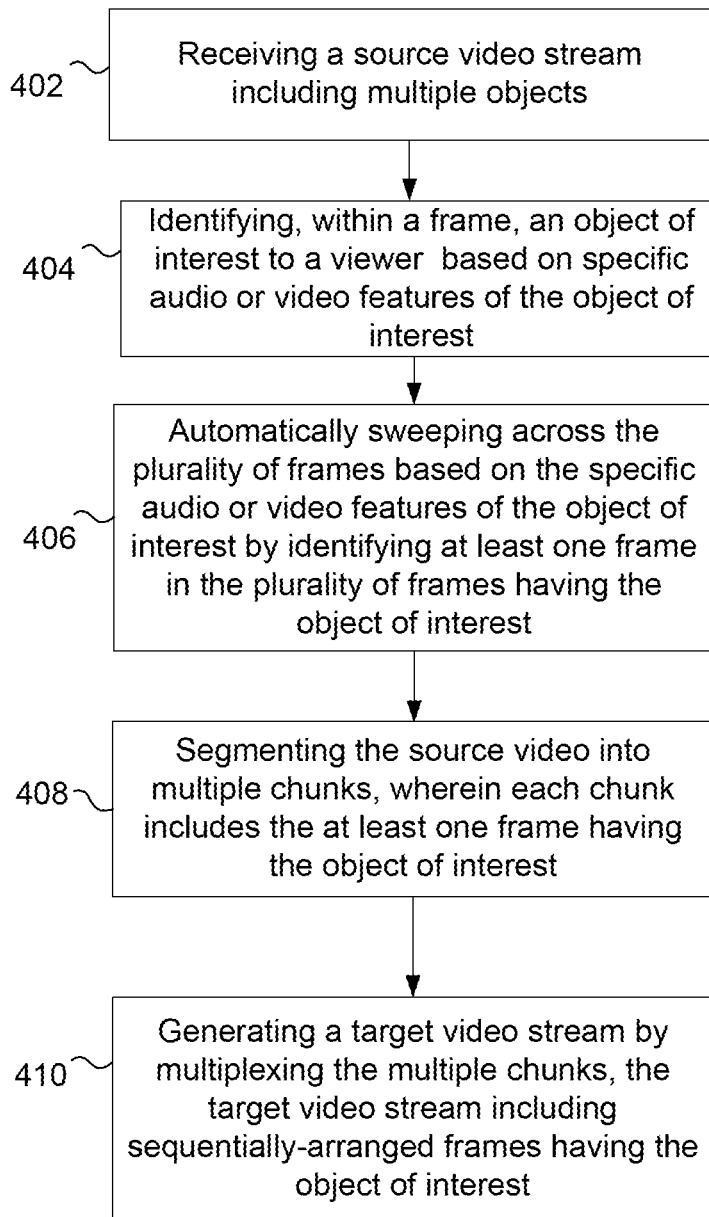
FIG. 4 illustrates a flow diagram showing a process associated with generating a target video stream with an object of interest to a viewer from a source video stream having multiple objects, according to some embodiments of the disclosed technology.

FIG. 4 illustrates a flow diagram showing a process associated with generating a target video stream with an object of interest to a viewer from a source video stream having multiple objects. At step 402, the process receives a source video stream including multiple objects. For example, the source video stream can be a personal video recording, a TV show, a pre-recorded sports event, a movie, a music video, a documentary, or streaming content from a content provider. The source video stream includes a plurality of frames, e.g., a collection of I, P, and B frames in for videos in the MPEG format. At step 403, the process identifies (within a frame in the plurality of frames) an object of interest to a viewer from the multiple objects based on specific audio or video features of the object of interest. In some embodiments, the process is trained to identify the specific audio or video features during a training phase in which one or more training content associated with the object of interest is provided to the process. As a result of the training, the process is able to "learn" specific audio and video features associated with the object of interest from the one or more training content. Examples of specific audio and video features associated with an object of interest can be a color of the object of interest, geometric attributes such as a height/width/depth of the object of interest, whether the object of interest changes form (animate) or does not change form (inanimate). Additionally, if the object of interest is animate, then specific audio and video features can be a color of different parts (e.g., the eyes, the shirt, the pants, etc.) of the object of interest, a pitch or a frequency of a voice of the object of interest, or an instrument played by the object of interest. Various other specific audio and video features can be associated with an object of interest. At step 406, the process automatically switches across the plurality of frames based on the specific audio or video features of the object of interest. As an outcome of the sweep, the process identifies at least one frame in the plurality of frames having the object of interest. At step 408, the process segments the source video stream into multiple chunks (each chunk includes the at least one frame having the object of interest) and generates (at step 410) a target video stream by multiplexing the multiple chunks. Consequently, the target video stream includes sequentially-arranged frames having the object of interest. In some embodiments, generating the target video stream includes re-encoding the source video stream. In some embodiments, the process optionally creates another target video stream with a zoomed-in or a zoomed-out view of the object of interest.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols. For example, the communications can include any combination of local area and/or wide area networks, using wired and/or wireless communication systems. The networks could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over the one or more networks may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for facilitating a personalized viewing experience in connection with an object of interest included in a source video content comprising:
    a first phase for identifying features specific to the object of interest using training video content including:
        receiving the training video content including the object of interest, wherein the training video content is distinct from the source video content;
        processing the training video content to identify one or more audio features and one or more video features, wherein the one or more audio features includes a change in a pitch or a frequency and the one or more video features includes a geometric attribute, a color, or an indication of a change in form;
        extracting, from the one or more audio features and the one or more video features based upon processing the training video content, at least one audio feature or at least one video feature specific to the object of interest;
    generating a list of objects including the object of interest in the source video content;
    receiving a user selection of the object of interest from the list of objects of interest;
    a second phase for identifying the object of interest using the source video content including:
        receiving the source video content including multiple objects distributed in a plurality of frames, the multiple objects including the object of interest;
        identifying, in the plurality of frames, the object of interest in response to detecting the at least one audio feature or the at least one video feature specific to the object of interest extracted during the first phase;
        segmenting the source video content into multiple chunks, wherein each chunk includes at least one frame having the object of interest; and
        generating a target video content by combining the multiple chunks, the target video content including sequentially-arranged frames having the object of interest.

2. The method of claim 1, wherein the target video content is a first target video content, further comprising:
    creating a second target video content with a zoomed-in or a zoomed-out view of the object of interest.

3. The method of claim 1, wherein the source video content includes at least one of: a personal video recording, a TV show, a pre-recorded sports event, a movie, a music video, a documentary, or streaming content from a content provider.

4. The method of claim 1, further comprising:
    receiving a selection of the object of interest via at least one mechanism allowing the selection of the object of interest, the at least one mechanism including: a remote control, an online web portal, a mobile application configured to run on a mobile device, or an application program included within a voice control system.

5. The method of claim 1, further comprising:
    re-encoding the source video content for generating the target video content.

6. The method of claim 5, wherein the source video content has a higher quality than the target video content.

7. A non-transitory computer-readable storage medium storing instructions configured for facilitating a personalized viewing experience in connection with an object of interest included in a source video content to perform a method comprising:
    a first phase for identifying features specific to the object of interest using training video content including:
        receive the training video content including the object of interest, wherein the training video content is distinct from the source video content;
        process the training video content to identify one or more audio features and one or more video features, wherein the one or more audio features includes a change in a pitch or a frequency and the one or more video features includes a geometric attribute, a color, or an indication of a change in form;
extract, from the one or more audio features and the one or more video features based upon processing the training video content, at least one audio feature or at least one video feature specific to the object of interest;
generating a list of objects including the object of interest in the source video content;
receiving a user selection of the object of interest from the list of objects of interest;
a second phase for identifying the object of interest using the source video content including:
receive the source video content including multiple objects distributed in a plurality of frames, the multiple objects including the object of interest;
identify, in the plurality of frames, the object of interest in response to detecting the at least one audio feature or the at least one video feature specific to the object of interest extracted during the first phase;
segment the source video content into multiple chunks, wherein each chunk includes at least one frame having the object of interest; and
generate a target video content by combining the multiple chunks, the target video content including sequentially-arranged frames having the object of interest.

8. The computer-readable storage medium of claim 7, wherein the target video content is a first target video content, wherein the method further comprises:
create a second target video content with a zoomed-in or a zoomed-out view of the object of interest.

9. The computer-readable storage medium of claim 7, wherein the source video content includes at least one of: a personal video recording, a TV show, a pre-recorded sports event, a movie, a music video, a documentary, or streaming content from a content provider.

10. The computer-readable storage medium of claim 7, wherein the method further comprises:
receive a selection of the object of interest via at least one mechanism allowing the selection of the object of interest, the at least one mechanism including: a remote control, an online web portal, a mobile application configured to run on a mobile device, or an application program included within a voice control system.

11. The computer-readable storage medium of claim 7, wherein the method further comprises:
re-encode the source video content for generating the target video content.

12. The computer-readable storage medium of claim 11, wherein the source video content has a higher quality than the target video content.

13. An apparatus for facilitating a personalized viewing experience in connection with an object of interest included in a source video content comprising:
a memory;
one or more processors electronically coupled to the memory and configured for:
a first phase for identifying features specific to the object of interest using training video content including:
receiving the training video content including the object of interest, wherein the training video content is distinct from the source video content;
processing the training video content to identify one or more audio features and one or more video features, wherein the one or more audio features includes a change in a pitch or a frequency and the one or more video features includes a geometric attribute, a color, or an indication of a change in form;
extracting, from the one or more audio features and the one or more video features based upon processing the training video content, at least one audio feature or at least one video feature specific to the object of interest;
generating a list of objects including the object of interest in the source video content;
receiving a user selection of the object of interest from the list of objects of interest;
a second phase for identifying the object of interest using the source video content including:
receiving the source video content including multiple objects distributed in a plurality of frames, the multiple objects including the object of interest;
identifying, in the plurality of frames, the object of interest in response to detecting the at least one audio feature or the at least one video feature specific to the object of interest extracted during the first phase;
segmenting the source video content into multiple chunks, wherein each chunk includes at least one frame having the object of interest; and
generating a target video content by combining the multiple chunks, the target video content including sequentially-arranged frames having the object of interest.

14. The apparatus of claim 13, wherein the target video content is a first target video content, further comprising:
creating a second target video content with a zoomed-in or a zoomed-out view of the object of interest.

15. The apparatus of claim 13, wherein the source video content includes at least one of: a personal video recording, a TV show, a pre-recorded sports event, a movie, a music video, a documentary, or streaming content from a content provider.

16. The apparatus of claim 13, wherein the memory is further configured for:
receiving a selection of the object of interest via at least one mechanism allowing the selection of the object of interest, the at least one mechanism including: a remote control, an online web portal, a mobile application configured to run on a mobile device, or an application program included within a voice control system.

17. The apparatus of claim 13, wherein the memory is further configured for:
re-encoding the source video content for generating the target video content.

* * * * *